(12) United States Patent
Tsubouchi et al.

(10) Patent No.: US 7,344,203 B2
(45) Date of Patent: Mar. 18, 2008

(54) MASTER CYLINDER

(75) Inventors: Kaoru Tsubouchi, Aichi (JP); Yoji Inoue, Aichi (JP); Katsuhiro Mita, Aichi (JP); Koji Suzuki, Aichi (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/959,427

(22) Filed: Oct. 7, 2004

(65) Prior Publication Data

US 2005/0110344 A1    May 26, 2005

(30) Foreign Application Priority Data

Oct. 10, 2003   (JP) ............................. 2003-352511

(51) Int. Cl.
*F15B 7/10* (2006.01)
(52) U.S. Cl. ..................... 303/114.1; 188/358; 60/592
(58) Field of Classification Search ............ 303/114.1; 188/348–359; 60/545–590, 592
See application file for complete search history.

(56) References Cited

U.S. PATENT DOCUMENTS

| | | | | |
|---|---|---|---|---|
| 1,650,742 A | * | 11/1927 | Rowan ...................... | 267/225 |
| 1,794,807 A | * | 3/1931 | Thompson ................. | 188/288 |
| 4,524,585 A | | 6/1985 | Coll et al. | |
| 5,044,161 A | * | 9/1991 | Schiel et al. ................. | 60/589 |
| 5,878,575 A | * | 3/1999 | Kreh et al. .................. | 60/562 |
| 5,970,711 A | * | 10/1999 | Kaneko et al. ............... | 60/588 |
| 6,000,220 A | * | 12/1999 | Simon Bacardit ............ | 60/562 |
| 6,318,082 B1 | * | 11/2001 | Hirayama ................... | 60/588 |
| 2005/0016173 A1 | * | 1/2005 | Tsubouchi et al. ............ | 60/562 |

FOREIGN PATENT DOCUMENTS

| | | | |
|---|---|---|---|
| FR | 2 820 387 | | 8/2002 |
| FR | 2820387 | * | 8/2002 |
| JP | 2000-71969 A | | 3/2000 |
| JP | 2003-261020 A | | 9/2003 |

* cited by examiner

*Primary Examiner*—Christopher P. Schwartz
(74) *Attorney, Agent, or Firm*—Buchanan Ingersoll & Rooney PC

(57) ABSTRACT

A master cylinder includes a cylinder body, primary cups supported on the inner periphery of the cylinder body, and a primary piston and a secondary piston inserted in the cylinder body so as to be in sliding contact with the respective primary cups. The cylinder body is integrally formed with annular walls behind the respective primary cups. The annular walls have a greater inner diameter than the inner diameter of the cylinder body to define annular passages between the annular walls and the respective pistons. Connecting passages having a greater radial dimension than the annular passage are defined between the inner periphery of the cylinder body and the respective pistons behind the respective annular walls so as to communicate with a reservoir. While the master cylinder is not actuated, piston ports formed in the respective pistons communicate with the reservoir through the respective annular passages and connecting passages. Brake fluid can thus be sucked smoothly into the respective pressure chambers both during a return stroke of the pistons and during automatic brake control such as vehicle stability control.

23 Claims, 3 Drawing Sheets

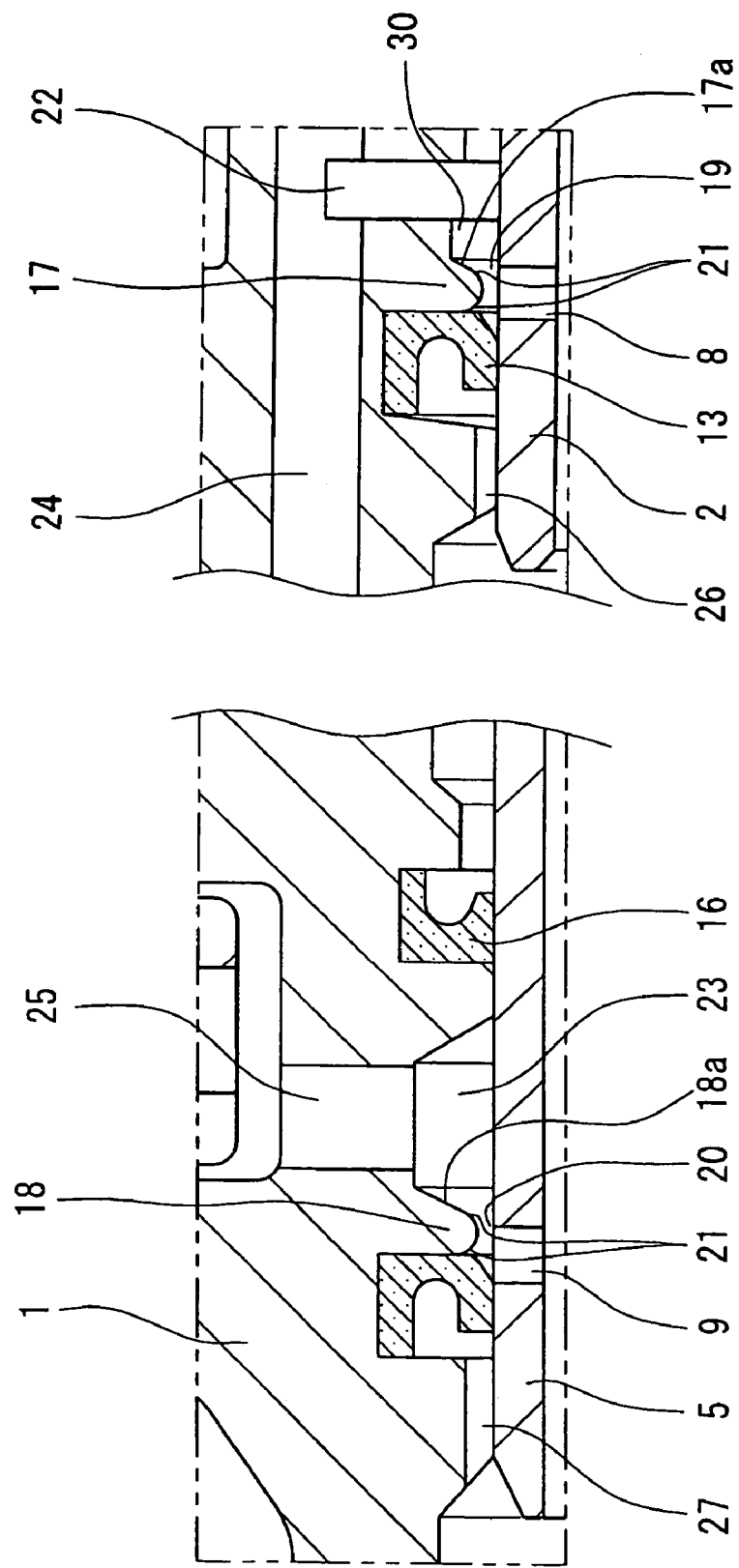

MASTER CYLINDER

BACKGROUND OF THE INVENTION

The present invention relates to a master cylinder used in a vehicle hydraulic brake system, and specifically a master cylinder including a piston which is in sliding contact with the inner peripheral surfaces of cups held on a cylinder body to pressurize brake fluid in a pressure chamber defined in the cylinder body. (Such a master cylinder is hereinafter referred to as a cup guide type master cylinder.)

Many of today's vehicle hydraulic brake systems have one or more automatic brake control functions which are initiated by an electronic control unit while the brake pedal is not pushed in, such as a vehicle stability control function.

Unexamined JP patent publication 2000-71969 discloses a cup guide type master cylinder used in this type of hydraulic brake system.

The master cylinder disclosed in this publication includes a spacer disposed between a primary cup surrounding the piston and a guide provided in the rear of the primary cup. A groove is formed rearwardly of the spacer through which brake fluid is supplied from a reservoir into a pressure chamber of the master cylinder.

It is required that a cup guide type master cylinder used for automatic brake control be capable of smoothly sucking brake fluid from the reservoir into the pressure chamber not only when the piston returns to its original, inoperative position after it has been advanced, but also during automatic brake control.

In order to fulfill both of these requirements, piston ports (ports formed in the piston) through which the pressure chamber communicates with the reservoir have to be positioned as close to the primary cup as possible when the brake pedal is not being operated and thus the piston is in its initial, inoperative position. For this purpose, the abovementioned spacer has to be as thin as possible.

When the piston returns, brake fluid is sucked from the reservoir into the pressure chamber through a gap defined around the primary cup because the primary cup is deformed under negative pressure produced in the pressure chamber. During automatic brake control, brake fluid is sucked into the pressure chamber through the piston ports.

In the arrangement of the above JP patent publication, hydraulic pressure tends to act on the spacer through the primary cup. The spacer thus tends to be subjected to large stresses, which may cause premature fatigue failure of the spacer.

In order to further smoothly suck brake fluid from the reservoir into the pressure chamber during automatic brake control, the back of the spacer has to be positioned further close to the piston ports. For this purpose, the thickness of the spacer has to be further reduced. This is however difficult because the groove is formed behind the spacer, so that the spacer has to be supported by a plurality of ribs. If the thickness of such a spacer is further reduced, its strength will be insufficient.

Further, because there exist diametric gaps between the spacer and the cylinder body and between the spacer and the piston, the spacer tends to move radially so as to be eccentric to the cylinder body. This impairs uniform flow of brake fluid through these gaps. Specifically, when the piston is returning toward its original position, brake fluid may not smoothly flow through the gap defined around the primary cup into the pressure chamber. While the piston is in its original position, brake fluid may not smoothly flow through the gap defined between the spacer and the piston and the piston ports into the pressure chamber.

Further, due to eccentric movements of the spacer relative to the cylinder body, the gaps between the spacer and the cylinder body and between the spacer and the piston tend to locally increase in radial dimension. Under hydraulic pressure, the primary cup may wedge into such a radially expanded portion of one of the gaps and get damaged.

The spacer and the guide have to be held in position by screwing a cover after mounting the spacer and the guide. Thus, this master cylinder is complicated in structure and needs a large number of assembling steps.

An object of the present invention is to provide a master cylinder of the abovementioned type which is free of any of the problems mentioned above, specifically, a master cylinder which is simple in structure but reliable, and which ensures smooth suction of brake fluid into the pressure chamber while the piston is returning and during automatic brake control.

SUMMARY OF THE INVENTION

According to this invention, there is provided a master cylinder comprising a cylinder body, a primary cup supported on an inner periphery of the cylinder body, and a piston inserted in the cylinder body so as to be in sliding contact with an inner periphery of the primary cup, the piston defining a pressure chamber in the cylinder body, the cylinder body being integrally formed with an annular wall behind the primary cup, the annular wall having a greater inner diameter than the inner diameter of the cylinder body to define an annular passage between the annular wall and the piston, wherein a connecting passage having a greater radial dimension than the annular passage is defined between the inner periphery of the cylinder body and the piston behind the annular wall so as to communicate with the annular passage, the connecting passage being adapted to communicate with a reservoir.

Since the annular wall, which receives pressure from the primary cup, is integral with the cylinder body, its strength is high enough.

The annular passage defined between the annular wall and the piston ensures smooth suction of brake fluid into the pressure chamber both through the gap formed between the cup and the piston while the piston is returning and through the piston ports during automatic brake control.

The master cylinder of the present invention fulfills all of the required functions with a smaller number of component parts. Machining and assembly are therefore easy and productivity is high.

Preferably, the annular wall has a thickness that gradually increases outwardly in a radial direction of the cylinder body. With this arrangement, the annular passage increases in sectional area, which ensures communication between the annular passage and the piston ports. The annular wall is further strengthened, too.

Preferably, the annular wall has a chamfer provided along at least one of radially inner, front and rear corners thereof, the chamfer having a small radius of curvature. Especially by forming such a chamfer along the inner front corner of the annular wall, the cup will never wedge into between this corner and the piston, and thus will never damage the The chamfer formed along the inner rear corner of the annular wall will serve to further increase the sectional area of the annular passage.

Preferably, the piston is in sliding contact with the inner periphery of the cylinder body in front of the primary cup and behind the annular wall. With this arrangement, the piston will be accurately kept coaxial with the axial wall, thereby keeping a constant dimension of the annular passage, which in turn ensures smooth flow of brake fluid therethrough. Damage to the primary cup is prevented, too.

Preferably, the piston is formed with piston ports through which the pressure chamber communicates with the connecting passage, the piston ports being positioned adjacent to the annular wall.

Preferably, the cylinder body is formed with a plurality of axial grooves through which the cup-receiving groove communicates with the pressure chamber in its inner periphery which is in sliding contact with the piston in front of the primary cup, the total cross-sectional area of the axial grooves being equal to or greater than the cross-sectional area of the annular passage. When the piston returns, brake fluid smoothly flows through the gap formed between the cup and the piston due to deformation of the cup and then through the abovementioned plurality of axial grooves into the pressure chamber. This ensures smooth return of the piston.

Preferably, the axial grooves have an arcuate cross-section so that they can be formed easily with e.g. a turning tool.

In the case of a tandem master cylinder, the claimed piston refers to either of the primary piston and the secondary piston.

BRIEF DESCRIPTION OF THE DRAWINGS

Other features and objects of the present invention will become apparent from the following description made with reference to the accompanying drawings, in which:

FIG. 3 is a partial enlarged view of the master cylinder shown in FIG. 1.

DETAILED DESCRIPTION OF THE PREFERRED EMBODIMENTS

Figure 1:
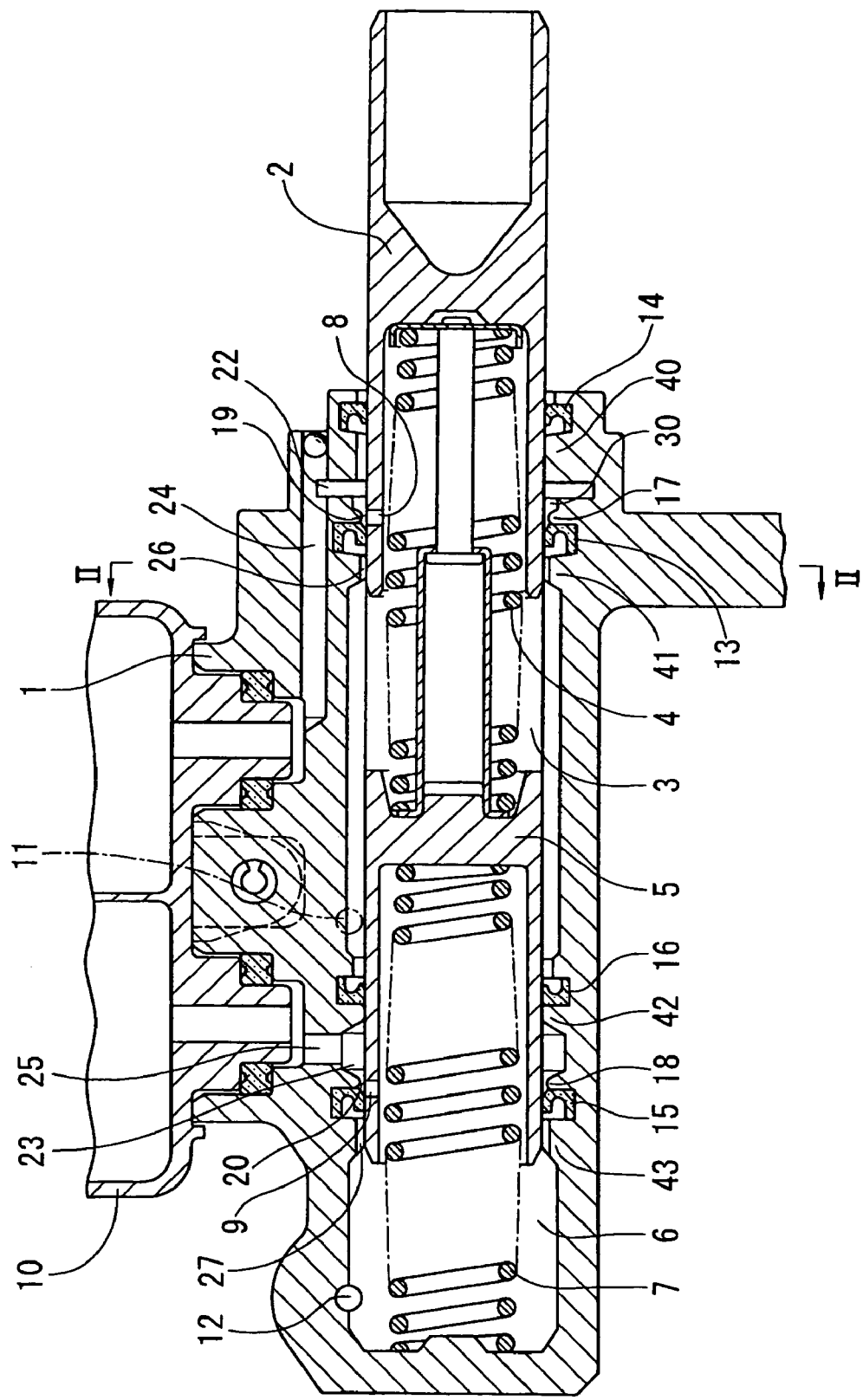
FIG. 1 is a sectional view of a master cylinder embodying the present invention.
Figure 2:
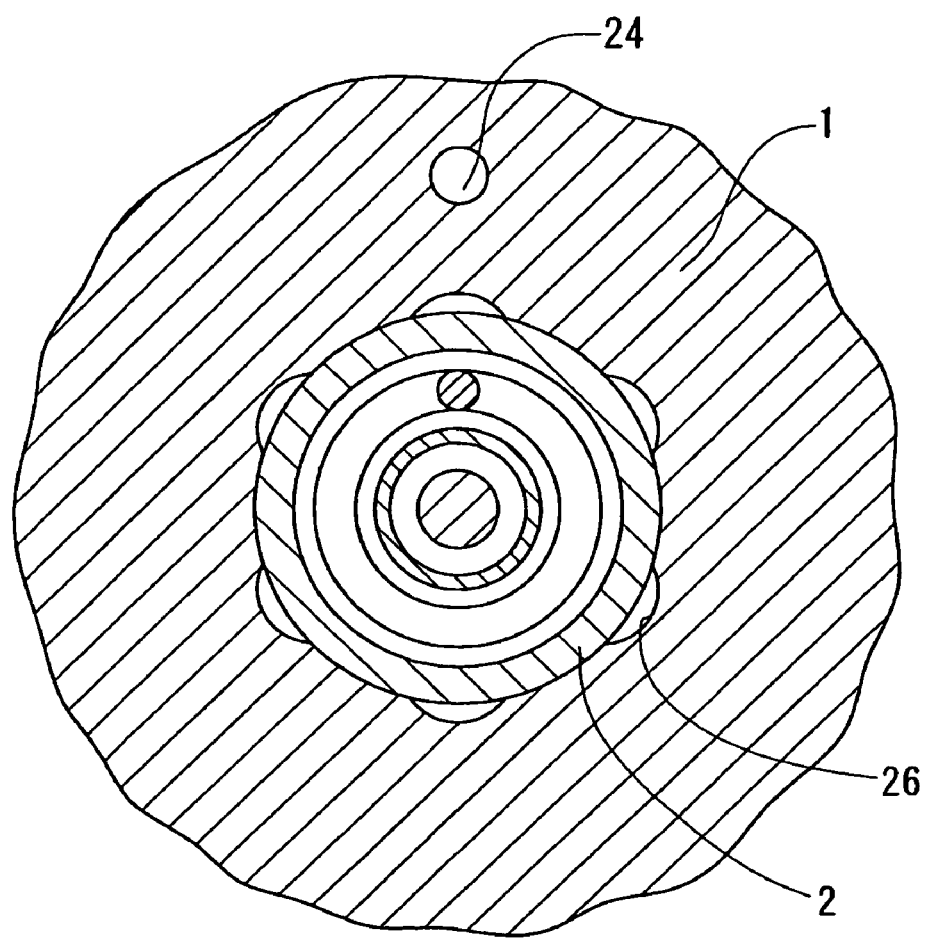
FIG. 2 is a sectional view taken along line II-II of FIG. 1.

Now referring to FIGS. 1-3, the master cylinder embodying the present invention basically comprises a cylinder body 1, a primary piston 2 slidably inserted in the cylinder body 1, and a secondary piston 5 slidably inserted in the cylinder body 1 in front (leftwardly in FIG. 1) of the primary piston 2. A first pressure chamber 3 is defined in the cylinder body 1 between the primary and secondary pistons 2 and 5. A return spring 4 for the primary piston 2 is mounted in the first pressure chamber 3. A second pressure chamber 6 is defined in the cylinder body 1 between the secondary piston 5 and the front end wall of the cylinder body 1. A return spring 7 for the secondary piston 5 is mounted in the second pressure chamber 6. Brake fluids in the first and second pressure chambers 3 and 6 are pressurized by the primary and secondary pistons 2 and 5, respectively, to produce brake hydraulic pressures. The primary piston 2 and the secondary piston 5 have a plurality of piston ports 8 and 9, respectively, which are arranged circumferentially at predetermined angular intervals.

Primary cups 13 and 15, a secondary cup 14 and a pressure cup 16 are fitted in annular grooves formed in the inner periphery of the cylinder body 1. The primary cup 13 and the secondary cup 14 are in sliding contact with the primary piston 2, the former sealing the outer periphery of the primary piston 2, and the latter serving as a seal between the interior of the cylinder body 1 and the atmosphere. The primary cup 15 and the pressure cup 16 are in sliding contact with the secondary piston 5, the former sealing the outer periphery of the secondary piston 5 and the latter serving as a seal between the first pressure chamber 3 and a reservoir 10.

Annular walls 17 and 18 are integrally formed on the inner periphery of the cylinder body 1 to support the backs (right-hand ends in FIG. 1) of the primary cups 13 and 15, respectively.

As shown in FIG. 3, the annular walls 17 and 18 have an inner diameter that is greater than the inner diameter of the cylinder body 1 to define annular passages 19 and 20 between the annular wall 17 and the primary piston 2 and between the annular wall 18 and secondary piston 5, respectively. The annular walls 17 and 18 have their radially inner front and rear edges removed by chamfers 21 having a small radius of curvature R.

Rearwardly of the annular wall 17, an annular passage 30 having a greater radial dimension than the annular passage 19 is defined between the inner wall of the cylinder body 1 and the primary piston 2. Rearwardly of the annular wall 18, an annular passage 23 having a greater radial dimension than the annular passage 20 is defined between the inner wall of the cylinder body 1 and the secondary piston 5. The annular passages 19 and 20 communicate with a reservoir 10 through the annular passages 30 and 23, respectively, and through passages 22, 24 and 25 that are formed in the cylinder body 1.

The piston ports 8 and 9 are positioned so as to substantially align with the annular walls 17 and 18, respectively, in a radial direction, when the master cylinder is not actuated.

The annular walls 17 and 18 have their back surfaces 17*a* and 18*a* inclined with respect to the radial direction of the cylinder body 1 such that their thicknesses gradually and radially outwardly increase. The inclined back surfaces 17*a* and 18*a* serve to increase the sectional area of the respective annular passages 19 and 20 at their ends communicating with the reservoir 10. Brake fluid can thus flow more smoothly through the annular passages 19 and 20. The inclined back surfaces 17*a* and 18*a* also serve to strengthen the respective annular walls 17 and 18, so that the annular walls 17 and 18 can withstand higher pressure. The primary piston 2 is in sliding contact with and guided by guide portions 40 and 41. The secondary piston 5 is in sliding contact with and guided by guide portions 42 and 43. In the embodiment, no guide portion is formed on the cylinder body 1 at its portion in the rear of the pressure cup 16. But a guide portion similar to the guide portions 41 and 43 may be formed at this portion.

In front of the respective primary cups 13 and 15, a plurality of axial grooves 26 and 27 having an arcuate cross-section are formed in the inner wall of the cylinder body 1 through which the grooves in which are received the respective primary cups 13 and 15 communicate with the first pressure chamber 3 and the second pressure chamber 6, respectively. FIG. 2 shows the cross-sections of the grooves 26. The grooves 27 have exactly the same cross-sections as the grooves 26.

The total cross-sectional area of either of the grooves 26 and 27 is equal to or greater than the cross-sectional area of each of the annular passages 19 and 20 so that brake fluid that has passed through the annular passages 19 and 20 can smoothly flow into the first and second pressure chambers 3 and 6.

The radial dimension of the annular passages 19 and 20 (clearance between the respective pistons and the annular walls) is preferably about 0.2-0.4 mm in view of the durability and operating characteristics of the master cylinder.

When the primary piston 2 and the secondary piston 5 return quickly from their advanced positions toward their original positions as a result of e.g. release of the brake pedal, negative pressure is produced in the pressure chambers 3 and 5. Thus, the radially inner portions of the primary cups 13 and 15 are deformed due to the difference between the pressure acting on the front side of the cups 13 and 15 and the pressure acting on the backs thereof in such a manner that gaps are formed between the cups and the pistons. Brake fluid can thus be smoothly sucked into the first pressure chamber 3 and the second pressure chamber 6 through these gaps and the grooves 26 and 27. This ensures smooth return of the primary piston 2 and the secondary piston 5, and thus improves response to the release or a quick return of the brake pedal.

On the other hand, when automatic braking control such as vehicle stability control is activated while the master cylinder is not activated, and a hydraulic unit connected to output ports 11 and 12 requires the supply of brake fluid, brake fluid will flow through the annular passages 19 and 20 and the piston ports 8 and 9 into the first pressure chamber 3 and the second pressure chamber 6, and then to the hydraulic unit. Because the annular passages 19 and 20 have their ends communicating with the reservoir 10 increased in sectional area by the inclined back surfaces 17*a* and 18*a* of the annular walls 17 and 18, brake fluid can be smoothly supplied to the hydraulic unit. Automatic brake control can thus be carried out with a good response.

Further, the inclined back surfaces 17*a* and 18*a* ensure that the annular passages 19 and 20 communicate with the piston ports 8 and 9 when the master cylinder is not activated, and also serve to strengthen the annular walls 17 and 18 by gradually and radially outwardly increasing their thicknesses.

The arcuate chamfers formed along the radially inner, front and rear corners of the annular walls serve to prevent damage to the primary cups and increase the sectional areas of the annular passages at their front and rear portions.

Since the grooves 26 and 27 have arcuate cross-sections, they can be easily formed with e.g. a turning tool.

The master cylinder of the present invention fulfills all of the required functions with a smaller number of component parts. Machining and assembly are therefore easy and productivity is high.

What is claimed is:

1. A master cylinder comprising a cylinder body, a primary cup supported on an inner periphery of said cylinder body, and a piston inserted in said cylinder body so as to be in sliding contact with an inner periphery of said primary cup, said piston defining a pressure chamber in said cylinder body, said cylinder body being integrally formed with an annular wall behind said primary cup, said annular wall having a greater inner diameter than the inner diameter of said cylinder body to define an annular passage between said annular wall and said piston, said annular wall having a front end face that faces the primary cup and supports the primary cup, said annular wall having a rear end face, the inner diameter of the annular wall which is greater than the inner diameter of the cylinder body extending from the front end face of the annular wall to the rear end face of the annular wall so that said annular passage extends rearward from the front end face of the annular wall to the rear end face of said annular wall, wherein a connecting passage of annular configuration having a greater radial dimension than said annular passage is defined between the inner periphery of said cylinder body and said piston behind said annular wall so as to communicate with said annular passage, said connecting passage being adapted to communicate with a reservoir, the rear end face of said annular wall facing the connecting passage, wherein said piston is formed with circumferentially spaced piston ports arranged to be in direct radial communication with said annular passage when the master cylinder is not actuated, and the annular passage being dimensioned to permit brake fluid flow through the annular passage when the master cylinder is not actuated so that when the master cylinder is not actuated the brake fluid is able to flow from said connecting passage to said pressure chamber through said annular passage and said piston ports.

2. The master cylinder of claim 1 wherein said annular wall has a thickness that gradually increases outwardly in a radial direction of said cylinder body.

3. The master cylinder of claim 1 wherein said annular wall has a chamfer provided along at least one of radially inner, front and rear corners thereof, said chamfer having a small radius of curvature.

4. The master cylinder of claim 1 wherein said piston is in sliding contact with the inner periphery of said cylinder body in front of said primary cup and behind said annular wall.

5. The master cylinder of claim 1 wherein said piston ports are positioned adjacent to said annular wall.

6. The master cylinder of claim 1 wherein said piston is in sliding contact with said cylinder body, wherein said primary cup is received in a cup-receiving groove formed in the inner periphery of said cylinder body, and wherein said cylinder body is formed with a plurality of axial grooves through which said cup-receiving groove communicates with said pressure chamber in its inner periphery in front of said primary cup, the total cross-sectional area of said axial grooves being equal to or greater than the cross-sectional area of said annular passage.

7. The master cylinder of claim 6 wherein said axial grooves have an arcuate cross-section.

8. The master cylinder of claim 1 further comprising a secondary cup positioned between the piston and the cylinder body at a position axially rearward of the primary cup so that the annular passage and the connecting passage are located axially between the primary cup and the secondary cup.

9. The master cylinder of claim 1 wherein said primary cup is received in a cup-receiving groove formed in the inner periphery of said cylinder body, and further comprising a plurality of axially extending grooves formed in said cylinder body and extending forwardly from said cup-receiving groove in a direction away from said annular passage to communicate said cup-receiving groove with said pressure chamber, the total cross-sectional area of said axially extending grooves being equal to or greater than the cross-sectional area of said annular passage.

10. The master cylinder of claim 1 wherein said piston is a first piston and said primary cup is a first primary cup, and further comprising a second piston positioned in said cylinder body at a position forward of said first piston, said second piston being slidably supported by a second primary cup and a secondary cup.

11. The master cylinder of claim 1 further comprising a through passage in said cylinder body positioned radially outwardly of the inner periphery of the cylinder body, the through passage having one end that opens into the reservoir, the through passage communicating the annular passage and the connecting passage with the reservoir.

12. The master cylinder of claim 1 wherein a radial dimension of the annular passage between said piston and said annular wall at which the inner diameter is greater than the inner diameter of the cylinder body is about 0.2 mm-0.4 mm.

13. A master cylinder comprising a cylinder body, a primary cup supported on an inner periphery of said cylinder body, and a piston inserted in said cylinder body so as to be in sliding contact with an inner periphery of said primary cup, said piston defining a pressure chamber in said cylinder body, said cylinder body being integrally formed with an annular wall having a front end face supporting said primary cup, said annular wall having a greater inner diameter than the inner diameter of said cylinder body, the inner diameter of the annular wall which is greater than the inner diameter of the cylinder body extending axially and rearwardly from the front end face of the annular wall so that an annular passage exists between said annular wall and said piston that extends axially and rearwardly from said front end face, wherein a connecting passage having a greater radial dimension than said annular passage is defined between the inner periphery of said cylinder body and said piston behind said annular wall so as to communicate with said annular passage, said connecting passage being adapted to communicate with a reservoir, said annular passage being configured to permit flow of hydraulic fluid through the annular passage when the master cylinder is not actuated so that when the master cylinder is not actuated fluid is able to flow from the connecting passage to the pressure chamber through the annular passage and at least one piston port in the piston.

14. The master cylinder of claim 13 wherein said annular wall has a thickness that gradually increases outwardly in a radial direction of said cylinder body.

15. The master cylinder of claim 13 wherein said annular wall has a chamfer provided along at least one of radially inner, front and rear corners thereof, said chamfer having a small radius of curvature.

16. The master cylinder of claim 13 wherein said piston is in sliding contact with the inner periphery of said cylinder body in front of said primary cup and behind said annular wall.

17. The master cylinder of claim 13 wherein said piston is formed with piston ports through which said pressure chamber communicates with said connecting passage, said piston ports being positioned adjacent to said annular wall.

18. The master cylinder of claim 13 wherein said piston is in sliding contact with said cylinder body, wherein said primary cup is received in a cup-receiving groove formed in the inner periphery of said cylinder body, and wherein said cylinder body is formed with a plurality of axial grooves through which said cup-receiving groove communicates with said pressure chamber in its inner periphery in front of said primary cup, the total cross-sectional area of said axial grooves being equal to or greater than the cross-sectional area of said annular passage.

19. The master cylinder of claim 18 wherein said axial grooves have an arcuate cross-section.

20. The master cylinder of claim 13 further comprising a secondary cup positioned between the piston and the cylinder body at a position axially rearward of the primary cup so that the annular passage and the connecting passage are located axially between the primary cup and the secondary cup.

21. The master cylinder of claim 13 wherein said primary cup is received in a cup-receiving groove formed in the inner periphery of said cylinder body, and further comprising a plurality of axially extending grooves formed in said cylinder body and extending forwardly from said cup-receiving groove in a direction away from said annular passage to communicate said cup-receiving groove with said pressure chamber, the total cross-sectional area of said axially extending grooves being equal to or greater than the cross-sectional area of said annular passage.

22. The master cylinder of claim 13 wherein said piston is a first piston and said primary cup is a first primary cup, and further comprising a second piston positioned in said cylinder body at a position forward of said first piston, said second piston being slidably supported by a second primary cup and a secondary cup.

23. The master cylinder of claim 13 wherein a radial dimension of the annular passage between said piston and said annular wall at which the inner diameter is greater than the inner diameter of the cylinder body is about 0.2 mm-0.4 mm.

* * * * *